UNITED STATES PATENT OFFICE.

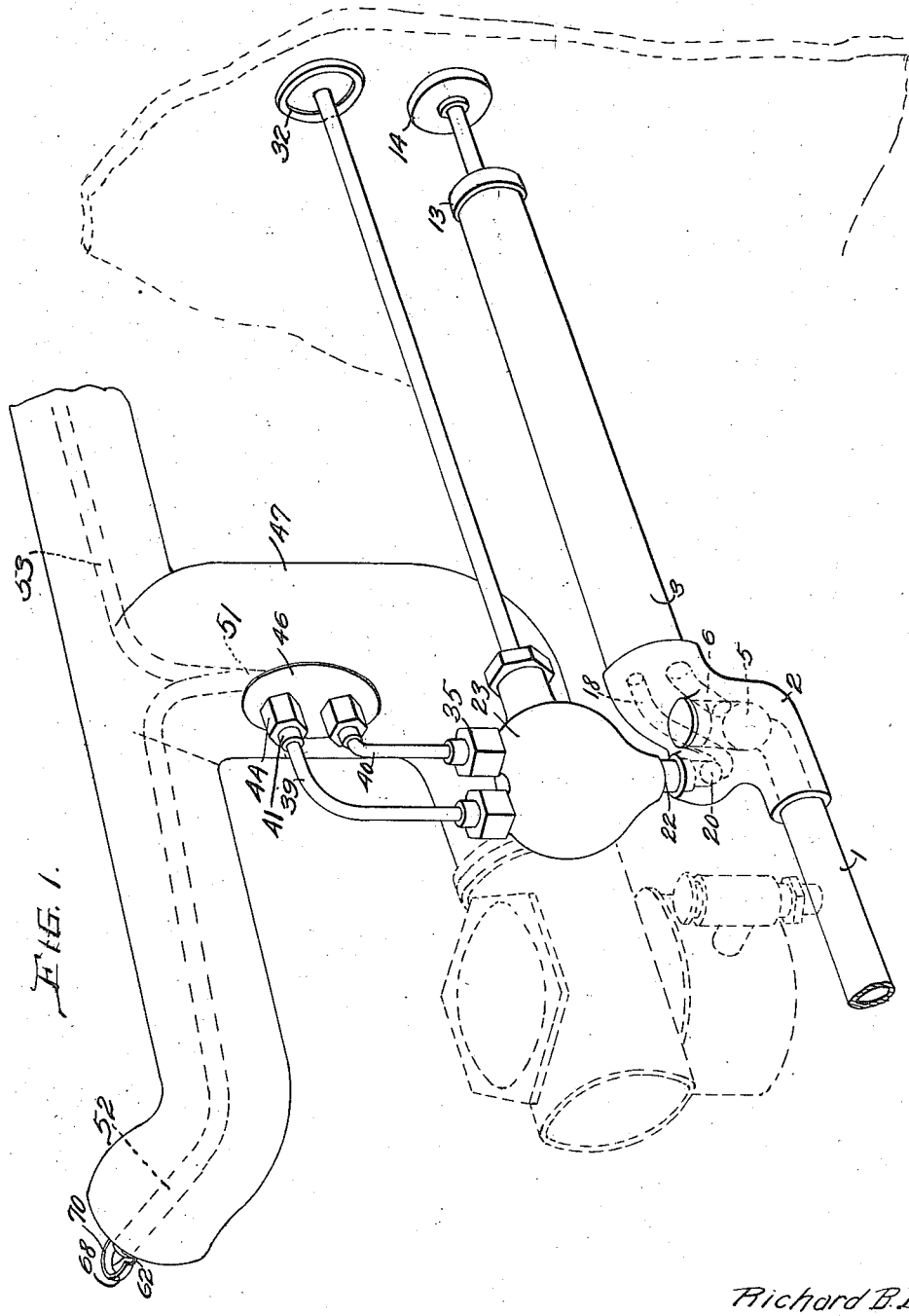

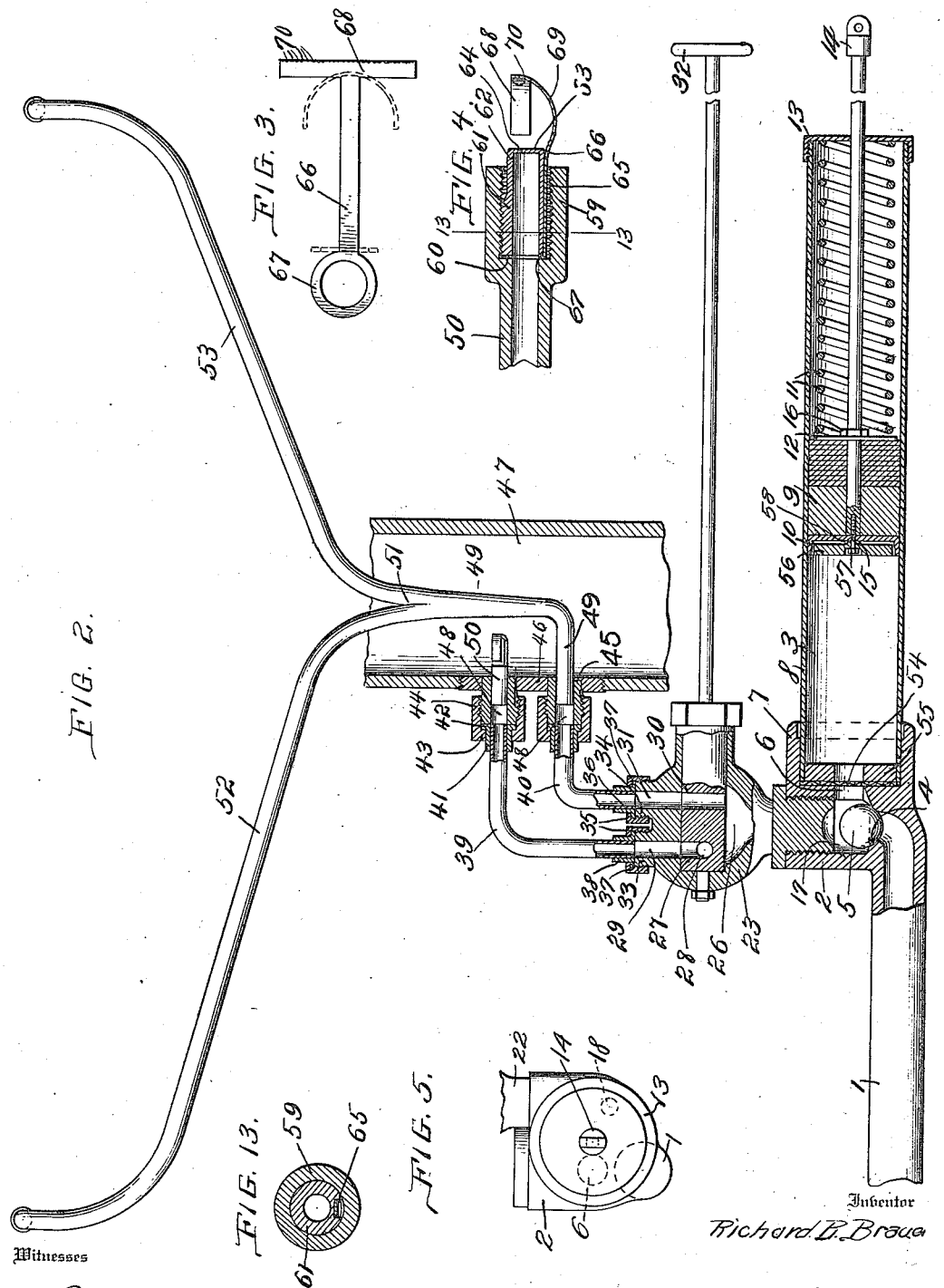

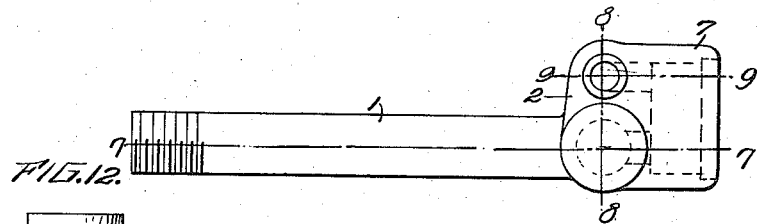
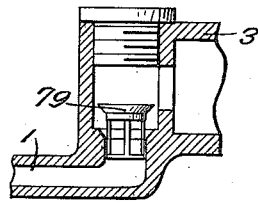
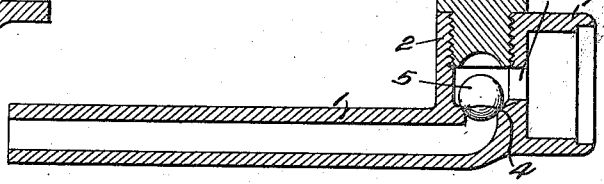
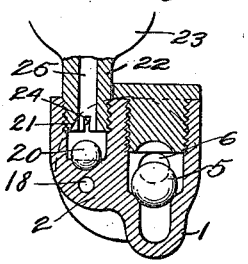
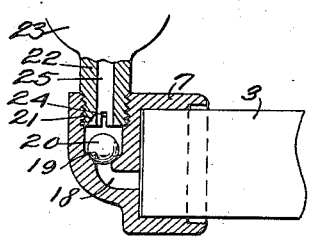
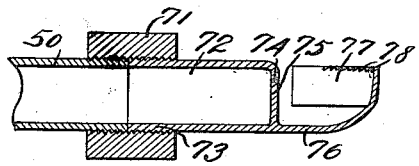

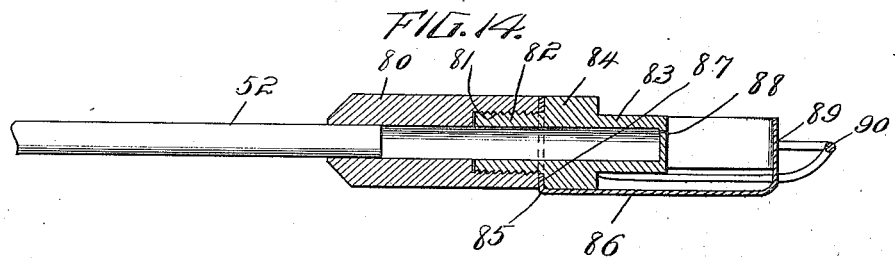
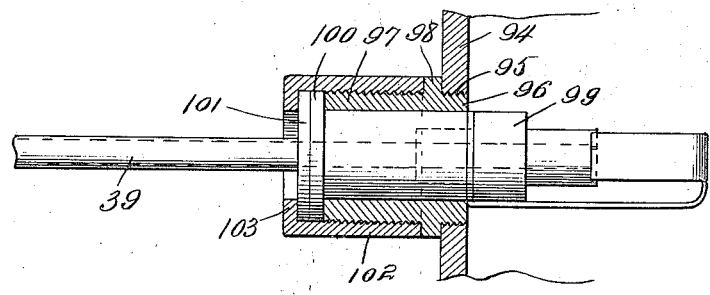
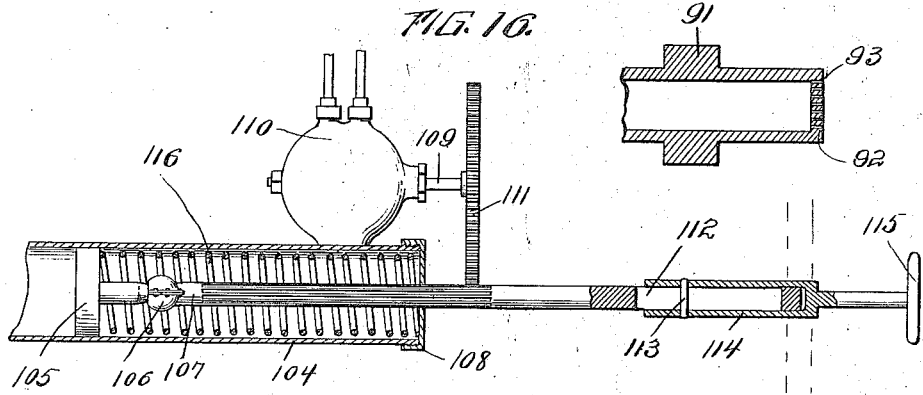

RICHARD B. BRAUER, OF RICHMOND, VIRGINIA.

GAS-ENGINE PRIMER.

1,155,205.  Specification of Letters Patent.  Patented Sept. 28, 1915.

Application filed August 28, 1914.  Serial No. 859,113.

*To all whom it may concern:*

Be it known that I, RICHARD B. BRAUER, citizen of the United States, residing at Richmond, in the county of Henrico and State of Virginia, have invented certain new and useful Improvements in Gas-Engine Primers; and I do hereby declare the following to be a full, clear, and exact description of the invention, such as will enable others skilled in the art to which it appertains to make and use the same.

This invention relates to primers for gas engines and the like, and one object of the invention is to provide an improved diffuser for producing a spray of liquid such as may be employed for priming gas engines, the device comprising simple means for breaking up into a fine spray a jet of volatile, inflammable liquid such as may be used for operating gas engines, and as a sample of which may be mentioned gasolene.

Another object of the invention is to provide means whereby such condensation as may collect upon the vital parts of the diffuser may be removed as it collects.

A further object of the invention is to provide a simple means for drawing the gasolene from the tank and projecting the same from a restricted opening against a baffle for producing the spray.

A still further object of the invention is to provide means whereby the gasolene drawn from the tank or any other source may be converted into a spray at a point or points somewhere within the engine intake—either in the manifold when the engine is hot, or both there and under the intake valves when the engine is cold.

With these and other objects in view the invention consists of certain novel constructions, combinations and arrangements of parts as will be hereinafter more fully described and claimed.

In the accompanying drawings, wherein similar reference characters designate corresponding parts, Figure 1 is a perspective view illustrating the application of the invention, showing the carbureter in dotted lines; Fig. 2 is a vertical section taken through the assembly shown in Fig. 1; Fig. 3 is a plan view of the baffle plate employed in the diffuser, before such plate has been bent to the position in which it is ultimately used; Fig. 4 shows the baffle plate bent in position and located in a suitable socket formed on the end of the gasolene feed pipe, Fig. 5 is an end view of the pump seen in section in Fig. 2, Fig. 6 is a top plan view of the feed pipe and valve casing, Fig. 7 is a vertical section on line 7—7 of Fig. 6, Fig. 8 is a vertical section on line 8—8 of Fig. 6, part of a switch valve being shown. Fig. 9 is a view similar to Fig. 8 taken on line 9—9 of Fig. 6, Fig. 10 is a central vertical section of another form of the diffuser, Fig. 11 is a bottom plan view of the baffle plate seen in the diffuser shown in Fig. 10, Fig. 12 shows a modified form of float valve which may be substituted for the ball valves shown in Figs. 8 and 9, Fig. 13 shows a vertical section on line 13—13 of Fig. 4. Fig. 14 is a vertical section of another form of diffuser, Fig. 15 is a vertical sectional view of a means for securing the lead pipes from the valve to the manifold, Fig. 16 is a vertical section of a modified form of pump control, Fig. 17 shows still a further modification of the spray producer nozzle.

The present invention employs a pump comprising a spring actuated piston moving in a cylinder which communicates by means of a check valved connection with the supply tank and also communicates by means of another check valved connection with a switch valve, one duct of which valve connects with a diffuser so located in the lower part of the manifold that the spray is forced upwardly, while the other duct connects with pipes which carry diffusers located under the intake valves of the engine. Broadly, each of these diffusers comprises a receptacle having a restricted opening facing a curved and preferably vertically disposed baffle plate, one edge of which is formed with a bur having numerous projections extending toward the opening between which the gasolene must pass after striking the baffle plate. The support for the baffle plate extends downwardly to conduct away any condensation which may have formed thereon.

Referring to the drawings, particularly Figs. 1 and 2, 1 shows a supply pipe which is in communication with a gasolene tank, (not shown), or as shown in dotted lines in Fig. 1, may be in communication with the carbureter of the engine, it being immaterial from which source the gasolene is drawn, and it will be seen that this supply pipe communicates with a valve 2 shown in Fig. 2 and through it with the pump 3 shown in Figs. 1 and 2.

The supply pipe 1 may be screwed into the valve casing as seen in Fig. 1 or may be integral therewith, as seen in Figs. 2 and 7. Whatever the construction, the pipe is in communication with a valve seat 4 which normally receives the ball 5 but which when raised opens the way to the duct 6. The valve casing is provided with a bell or cup-shaped mouth 7 into which is secured in any suitable manner the cylinder 8 of the pump 3.

Mounted within the cylinder 8 is a piston 9 having a washer 10 of any material which will not be acted upon by the gasolene or other liquid which may be employed for operating a gas engine. Spring 11, which is interposed between the plate 12 at the rear of the piston and the cap 13 at the outer end of the cylinder opposes the piston when the latter is drawn rearwardly by drawing upon the handle 14. The piston is secured by means of screw 15 and lock nut 16 to the rod. Obviously, as the piston is drawn backwardly, the ball 5 will be raised into the compartment 17 to permit the gasolene to pass from the tank to the pump. When the handle 14 is released, the spring 11 will force the piston 9 toward the valve and by reason of principles well understood, the ball 5 will be seated upon the seat 4 to prevent return of the gasolene in the cylinder to the tank. By referring to Figs. 6 and 9 it will be seen that there is leading away from bell 7 a duct 18 terminating in the seat 19 upon which normally rests a ball 20 smaller than ball 5. As the liquid is forced into the duct 18, it will raise ball 20 and force the same against the lower end 21 of the stem 22 of a switch valve 23. In order that the raising of the valve 20 may not check the passage of gasolene a slot 24 may be cut radially of the stem and be of such depth as not to be completely covered by the ball when the latter is in raised position. The gasolene passing upwardly through slot 24 will pass through duct 25 in the stem and into the lower chamber 26 (see Fig. 2) of the switch valve 23, which valve may be of any form and not necessarily of the form shown.

The plug 27 of valve 23 has a port 28 which, when in proper position, will afford communication from chamber 26 to duct 29 in one arm of the valve, while a second port 30 coöperates in a similar manner with a duct 31 in the other arm. The ports are so arranged that the hot and cold primers may both be operated by proper setting of the switch valve when it is desired to start a cold engine, but that the hot primer alone will be operable when the engine is warm. A handle 32 is provided for turning the rotary plug 27 of the valve.

Upstanding from the top of the valve 23 are two nipples 33 and 34 through which pass ducts 29 and 31 respectively, each of these nipples being externally threaded to receive a lock nut 35 having an inbent flange 36 which overhangs an outwardly extending flange 37 formed upon a bushing 38 soldered or otherwise connected to the lower ends of the leading pipes shown connected to the top of the valve in Fig. 2. The connection just described is common to both of these pipes which are numbered respectively 39 and 40. The upper end of each of these pipes carries a nipple 41 having an outwardly extending flange 42 which is engaged by an inwardly extending flange 43 of a lock nut 44 screwed upon the threaded connection 45 soldered or otherwise secured to plate 46 which is screw threaded into the manifold 47. The connection which is associated with leading pipe 39 has a duct 48 communicating with pipe 50, while the other connection 45 which is in communication with leading pipe 40 connects with pipe 49. The pipe 49 branches as at 51 and has two arms 52 and 53 respectively extending through the manifold to points under the intake valves of the engine. The pipe 50 terminates in the vertical portion of the manifold as seen in Fig. 2, and this pipe and the arms 52 and 53 are connected to spray producing devices or diffusers which will be described hereinafter.

The ducts 6 and 18 are screened by means of suitable wire screen 54 held within cylinder 8 by an internal collar 55 as seen in Fig. 2. In order that these two ducts may be effectively closed when the priming device is not being used, spring 11 is designed to force piston 9 against the collar 55 for the purpose of holding a disk 56 tightly over said ducts. This disk is made of sufficient diameter to cover the openings of ducts 6 and 18 and as seen in Fig. 2 has the outer surface counter-sunk to receive the head 57 of screw 15, while the rear surface of the disk is projected in a boss 58 to form a comparatively small support for the disk. It follows that under the pressure of spring 11 the disk 56 will be forced against the collar 55 to close the ducts 6 and 18, the disk rocking or tilting upon the small boss or projection 58 to adjust itself to the surface of the collar 55.

The spray producer or diffuser heretofore mentioned may be made in several ways, one being shown in Figs. 3 and 4.

Referring to Fig. 4, the pipe 50 (or 52 or 53) is seen to be provided with an internally threaded socket 59 having an internal shoulder 60 against which the open rear end of the externally threaded nozzle 61 lies, the forward end of the nozzle 61 being reduced as at 62 and having a front wall 63 provided with a restricted opening 64 which may be formed in any approved manner, and be of the requisite size. By referring to Fig. 13, it will be seen that the lower side of the nozzle 61 in the position shown in said figure is provided with a groove 65 extending longitudinally thereof and of such depth as will receive strip 66 without the latter being engaged by the interior threads of the socket 59. The interior of the nozzle 61 is in communication with the proper pipe as seen in Fig. 4, the one here shown being pipe 50.

Fig. 3 shows the blank of the baffle plate against which the jet of gasolene issuing from restricted opening 64 strikes, the same comprising the already mentioned strip 66, the eye 67 in the baffle plate 68. The eye 67 is adapted to be bent at right angles to the strip as shown in dotted lines in Fig. 3 and lies between the shoulder of the socket and the open end of the nozzle 61, so that when the latter is screwed tightly in place the strip and eye are rigidly held to the socket. The baffle plate 68 is bent, as indicated in dotted lines in Fig. 3, so as to be dished with respect to the receptacle, and as shown in Fig. 4 is also disposed substantially with the dished surface standing vertically. The strip 66 is made of sufficient length so that the same may be depressed as at 69 to provide a point below the threads of the socket from which liquids of condensation may drop after having passed from the baffle plate 68. As seen at 70 in Fig. 4, but more particularly in Fig. 11, the upper edge of the baffle plate is provided with a bur forming a great number of small projections which extend toward the nozzle, so as to be substantially at right or other angles with the vertical plane of the baffle plate. These projections are so placed that the gasolene issuing from the restricted opening 64 will strike the baffle plate just below the projections as seen in Fig. 4 and therefore as the liquid spreads out over the baffle plate, that part which is directed toward the projections will necessarily pass between the projections and thereby be broken up into very fine particles to produce the spray or dense gas mixture for explosive. The strip 66 being bent and depressed as at 69 as already described, makes it possible to vary the distance between the projections and the opening.

Another form of diffuser as shown in Figs. 10 and 11 comprises a collar 71 threaded internally to receive one of either of the pipes 50, 52 and 53, the pipe 50 being shown in Fig. 10. The receptacle nozzle 72, has one end threaded as at 73 to engage the interior threads of the collar 71 and designed to abut the shoulder formed by the end of the pipe 50, there being a restricted opening 74 in the vertical front wall 75 of the receptacle. The receptacle has formed integral therewith a strip 76 which extends upwardly to carry the baffle plate 77 which is provided at the upper edge thereof with serrations, bur projections, or other small and closely arranged members 78 between which the gasolene which issues from the opening 74 must pass when spread out by the baffle plate.

While ball valves have been shown in the valve 2, yet this is but one of several forms of valves which may be employed, such for instance as float valves shown in Fig. 12. This valve has a float 79 which is interposed between the feed pipe and the cylinder of the pump and may be employed for both the balls 5 and 20 when the device is not used in a vertical position, in which position the balls would not give perfect satisfaction.

It is to be understood that the supply pipe 1 may be connected either with the tank or with the carbureter. In actual practice it is found that when a priming device such as disclosed herein has been added to an engine one or more turning over of the engine is sufficient to start the same, and as it is not necessary to provide air for the mixture, it would appear that the manifold has in it sufficient air to make the mixture explosive, the carbureter valve being opened.

The operation of the device is thought to be sufficiently understood from the description given and no further discussion of the operation is thought necessary.

It is to be understood that the handle of the valve 23 is turned so as to admit gasolene from the chamber 26 through the pipe 39 when the engine is hot, and the discharge of the products of gasolene or other explosive mixture in the manifold will be sufficient to start the engine. However, when the engine is cold, the handle 32 will be turned so as to admit gasolene or other explosive mixture through said pipe for discharge in the manifold, and also from the chamber 26 through the pipe 49 for discharge through arms 52 and 53 to the intake valve, and also into 39.

The baffle plate 68 is curved so as to produce a partly cylindrical spray which will be more suited to enter a rounded intake valve, although there are other advantages to be had from dishing or curving the baffle plate adjacent the restricted opening.

Still another form of diffuser may be employed, such as shown in Fig. 14. One of the pipes to which the diffuser is to be attached, as 52, has connected thereto by soldering or other means, a socket member 80 formed with internal threads 81 which receive the reduced and threaded extension 82 of the nozzle 84. The rear end of the latter is designed to compress the upstanding eye 85 of a strip 86 against shoulder 87 formed by the end of the socket 80, so as to hold the same firmly in place. It is of course within the invention to supply such packing as may be found necessary to prevent leakage at this point. As is common with the other forms of diffusers already described, the outer portion 83 of the nozzle is reduced and its outer end wall is provided with a restricted opening 88 from which issues a stream of inflammable mixture against baffle plate 89 to be broken into a fine spray as already described. In any of the forms described it will be possible to solder the device for collecting the liquid from the baffle plate to the receptacle from which the gasolene issues. The baffle plate may be made planate when located under the intake valves and may be in a vertical position to throw the spray either upwardly or downwardly or may be in a horizontal position to throw the spray forwardly or backwardly with respect to the intake valve as the case may be, but it is understood that the preferable position is to throw the spray upwardly. The diffuser located in the manifold used for hot priming may be planate or rounded. The diffusers located at the ends of pipes 52 and 53 and employed as cold primers are not necessarily located under the intake valves but may be located near to them so as to throw a horizontal spray toward them. When the cold primers connected to pipes 52 and 53 are passed into the manifold it may be found necessary to provide some means to prevent injury to the baffle plate and this means may comprise a wire guard shown generally at 90 which is secured either to the socket 80 or to the nozzle 83.

While the baffle plate has been shown as an important adjunct to the invention yet I may provide a nozzle 91 seen in Fig. 17 with a wall 92 provided with a number of restricted openings 93 which may be made so small as to produce a sufficiently fine spray of themselves without the necessity of a baffle plate. The restricted openings 93 and also the restricted openings in any of the other forms may be made round, square, oblong or any other shape which may be found to give the best results. The spray producer seen in Fig. 17 does not require a strip to collect any liquid which may have condensed on the baffle plate, and it may also be mentioned that other forms of spray producer may be constructed without the means for collecting the condensation. As has already been mentioned, suitable means such as screens may be employed for preventing the flow of solid particles into the nozzle where they might stop up the restricted openings.

By referring to Fig. 15 there will be seen a modified form of the means for connecting the diffuser with a manifold 94. The manifold 94 is provided with a threaded opening 95 which receives the threaded extension 96 of the nipple 97 having a shoulder 98 to prevent stripping of the threads on the extension 96. The diffuser or spray producer indicated at 99 has the flanged end 100 which is designed to fit closely against the end of the nipple 97, and a washer 101 on the gasolene feed pipe 39 contacts with the flange 100.

In order to effect a tight joint and also support pipes 39 and the spray producer 99, a lock nut 102 is employed having an inwardly extending flange 103 which binds the washer 101 against the flange 100 when said lock nut is screwed on to the threaded nipple 97. Here again, any suitable means may be employed for preventing leakage of the joint. This form of connection may be used with either primer. It is desirable to have the hot primer located above the cold primer as seen in Fig. 2, so that the spray issuing from the hot primer will not be directed against the horizontal portion of the pipe 49.

If it be desired to actuate the pump and switch valve from one point of control, a construction may be employed such as illustrated in Fig. 16. The cylinder 104 may have a piston, indicated diagrammatically at 105, which is connected by means of a ball and socket joint shown at 106 to the inwardly extending end of fluted rod 107. The fluted rod is in fact a gear wheel of suitable length and has the teeth thereof extending loosely through cap 108 screwed on to the end of cylinder 104. The stem 109 of the switch valve 110 has feathered or otherwise secured thereon a gear wheel 111 which meshes with the teeth of the fluted rod 107. A part of the rod 107 extends outside the cylinder 104, as seen at Fig. 16, is cylindrical and is provided with a slot 112 in which is located the pin 113 extending diametrically through a sleeve 114 which surrounds the cylindrical end of the rod. This sleeve is provided with a suitable withdrawing handle 115. When the handle 115 is located near the crank of an automobile which is not provided with a starter, the handle may be withdrawn until the pin 13 reaches the end of the slot 112 and therefore requires piston 115 to be withdrawn against the action of spring 116. The handle 115 then will be in the path of rotation of the crank, but by pushing the handle in again quickly the sleeve 114 will slide over the cylindrical part of the rod and the handle will be out of the path of the crank. By this construction, the valve may be turned so as to have either the hot primer alone or the hot and cold primer together, as may be desired, in communication with the chamber 26 of the valve, after which the gasolene may be sent to the elected primer. The relation of the parts shown in Fig. 16 need not necessarily be followed.

What is claimed is:

1. A primer for multi-cylinder explosive engines comprising a source of fluid fuel supply, a switch valve whose stem is connected therewith, devices located at different points within the engine intake for producing spray, connections between the arms of the valve and said devices respectively, and means for setting the valve plug manually.

2. A primer for multi-cylinder explosive engines comprising a source of gasolene supply, a switch valve whose stem is connected therewith, diffusers located at different points within the engine intake for producing spray, connections between the arms of the valve and the respective diffusers, and means for setting the valve plug manually to connect its stem with one arm or with both arms.

3. A primer for gasolene engines comprising a source of gasolene supply, a switch valve whose stem is connected therewith, a diffuser adjacent the intake valve of the engine, another diffuser in the intake pipe remote from the first-named diffuser, connections between the arms of the valve and the respective diffusers, and means for setting the valve manually.

4. A primer for multi-cylinder gasolene engines comprising a source of gasolene supply, a switch valve whose stem is connected therewith, a diffuser within the intake manifold and connected with one arm of the valve, a set of diffusers under the intake valves of the engine, a pipe connected with the other arm of the valve and leading to the diffusers in said set, and means for setting the valve plug.

5. A primer for explosive engines comprising a source of gasolene supply, a switch valve, a diffuser within the intake manifold and connected with one arm of the valve, a set of diffusers adjacent the intake valves of the engine and connected with the other arm of said switch valve, means for setting the switch valve manually, and means for passing a charge of gasolene under pressure from the supply to the stem of the switch valve.

6. A primer for explosive engines comprising a source of gasolene supply, a switch valve, a diffuser within the intake manifold and connected with one arm of the valve, a set of diffusers adjacent the intake valves of the engine and connected with the other arm of said switch valve, means for setting the switch valve manually, a pump, a valve casing having ducts whereof one connects said source with the pump and the other connects the pump with the stem of said switch valve, and check valves in said ducts.

7. A primer for explosive engines comprising a source of gasolene supply, a switch valve, devices located within the engine intake for producing gasolene spray, connections between the arms of the valve and said devices respectively, means for setting said valve manually, a cylinder, connections between its interior and said source and between its interior and the stem of said valve, check valves within said connections, a piston within the cylinder, mechanical means for moving it in one direction, and manual means for permitting its retraction.

8. A primer for explosive engines comprising a gasolene pipe, diffusers located within the engine intake at different points, a switch whose arms are connected respectively to said diffusers, and means for setting the switch manually; combined with a pump including a cylinder, a piston therein having a rod and handle, and a spring for moving the piston in one direction; connections between the cylinder and said pipe and between the cylinder and said switch, and check valves in said connections.

9. A primer for explosive engines comprising a gasolene pipe, diffusers located within the engine intake at different points, and a switch valve whose arms are connected respectively to said diffusers; combined with a pump barrel, connections between it and said pipe and between the barrel and said switch valve, check valves in said connections, a piston movable within said barrel, a fluted rod projecting from the piston out the rear end of the barrel and carrying a handle, and switch-valve-actuating mechanism including a gear whose teeth engage said rod.

10. A primer for explosive engines comprising a source of gasolene supply, diffusers located within the engine intake at different points, and a switch valve whose arms are respectively connected with said diffusers; combined with a pump cylinder having valved connections with said source and with the stem of said switch valve, a spring-actuated piston within said cylinder, a fluted rod projecting from the piston out of the barrel and carrying a handle, and a gear fast on the plug of said switch valve and having its teeth meshing with the flutes on said rod.

11. The combination with the intake of an internal combustion engine; of a fluid fuel diffuser located within said intake and comprising a tubular nozzle having a wall closing its outer end and pierced with an opening, a curved baffle plate standing remote from said wall and opposite said opening and provided with projections directed toward the opening, means for holding the plate in such position, and means for supplying the fuel to said diffuser.

12. The combination with the intake of an internal combustion engine; of a fluid fuel diffuser located within said intake and comprising a tubular nozzle disposed horizontally and having a wall closing its outer end and pierced with an opening, a baffle plate standing remote from said wall and opposite said opening, a dripper strip attached to the plate, leading downward therefrom, and connected with the nozzle, and means for supplying the fuel to said diffuser.

13. The combination with the intake of an internal combustion engine, a fluid fuel supply pipe, and an internally threaded member carried thereby; of an externally threaded tubular nozzle screwed into said member and having its outer end closed except for a fine opening, a baffle plate standing opposite said end and provided with projections directed toward it, and a dripper strip connecting said plate and nozzle.

14. The combination with the intake of an internal combustion engine, a fluid fuel supply pipe, and an internally threaded socket carried thereby and having a shoulder; of an externally threaded tubular nozzle screwed into the socket and having its outer end closed except for a fine opening, a curved baffle plate standing opposite said opening, an eye clamped between the shoulder and nozzle, and a strip connecting the plate and eye.

15. The combination with the intake manifold of an internal combustion engine, and a gasolene supply pipe having at its end an internally threaded socket whose bore is larger than that of the pipe so as to leave a shoulder between them; of an externally threaded nozzle screwed into the socket and having a longitudinal groove through its threads, its outer end projecting into said manifold and being closed except for a spray opening, a baffle plate standing opposite said opening, an eye clamped between said shoulder and the inner end of the nozzle, and a strip connecting the plate and eye and lying within said groove.

16. The combination with the intake of an internal combustion engine, a gasolene supply pipe, and a nozzle on said pipe projecting into the intake and having its end closed except for a spray opening the nozzle also having a longitudinal external groove along one side; of a curved baffle plate within the intake standing opposite said opening and having projections directed toward it, a dripper strip depending from the plate and directed thence along said groove, and means for holding it within the same.

17. The combination with the intake of an internal combustion engine, diffusers in the intake at different points, and a gasolene supply pipe; of a switch valve comprising a casing having a single inlet through its stem connected with said supply pipe and two outlet ducts through its arms connected respectively with the diffusers, and a plug within the casing having two ports adapted to simultaneously connect the inlet with both said ducts and another port adapted to connect the inlet with only one duct, for the purpose set forth.

18. The combination with a supply pipe, a pump, and a tubular stem; of a valve casing having a duct connecting the pipe and pump and a second duct connecting the pump and stem, each duct having a valve seat, and valves in said ducts closing toward the pipe and pump respectively.

19. A primer for explosive engines comprising a source of gasolene supply, diffusers located within the engine intake at different points, a switch valve whose arms are respectively connected with said diffusers, and a gear carried by said valve; combined with a pump comprising a barrel, a spring-actuated piston therein, a fluted piston rod extending out of the rear end of the barrel and engaging said gear, its outer extremity being squared and provided with a longitudinal slot, a handle having a sleeve slidably embracing the squared end of the rod, and a pin in the sleeve projecting into the slot, for the purpose set forth.

In testimony whereof I affix my signature in presence of two witnesses.

RICHARD B. BRAUER.

Witnesses:
E. M. Mallory,
Frank S. Richeson.